US012347377B2

(12) United States Patent
Eun et al.

(10) Patent No.: US 12,347,377 B2
(45) Date of Patent: Jul. 1, 2025

(54) DISPLAY DEVICE INCLUDING STAGE TRANSISTOR

(71) Applicant: LG Display Co., Ltd., Seoul (KR)

(72) Inventors: Ju-Hee Eun, Paju-si (KR); Jin-Hun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/513,350

(22) Filed: Nov. 17, 2023

(65) Prior Publication Data

US 2024/0212616 A1 Jun. 27, 2024

(30) Foreign Application Priority Data

Dec. 23, 2022 (KR) ........................ 10-2022-0182698

(51) Int. Cl.

*G09G 3/3233* (2016.01)
*G09G 3/20* (2006.01)
*G09G 3/3266* (2016.01)

(52) U.S. Cl.

CPC ......... *G09G 3/3233* (2013.01); *G09G 3/2096* (2013.01); *G09G 3/3266* (2013.01); *G09G 2300/0819* (2013.01); *G09G 2300/0842* (2013.01); *G09G 2300/0861* (2013.01); *G09G 2310/0243* (2013.01); *G09G 2310/0286* (2013.01); *G09G 2310/08* (2013.01);

(Continued)

(58) Field of Classification Search

CPC .. G09G 3/3233; G09G 3/2096; G09G 3/3266; G09G 2300/0819; G09G 2300/0842; G09G 2300/0861; G09G 2310/0243; G09G 2310/0286; G09G 2310/08; G09G 2320/0209; G09G 2320/0233; G09G 3/3225; G09G 2310/021; H10K 59/131

See application file for complete search history.

(56) References Cited

U.S. PATENT DOCUMENTS 10,810,920 B2 * 10/2020 Jang .......................... G09G 5/18
10,891,903 B2 * 1/2021 Takasugi .............. G09G 3/3225
11,594,169 B2 2/2023 Kim et al.

(Continued)

FOREIGN PATENT DOCUMENTS

KR 10-2022-0090924 A 6/2022
KR 10-2022-0094916 A 7/2022

*Primary Examiner* — Jeff Piziali

(74) *Attorney, Agent, or Firm* — Fenwick & West LLP

(57) ABSTRACT

A display device is provided. The display device includes: a timing controlling unit generating an image data, a data control signal and a gate control signal; a data driving unit generating a data signal using the image data and the data control signal; a gate driving unit generating a gate1 signal, a new gate1 signal, an odd gate2 signal, an even gate2 signal and an emission signal using the gate control signal and including a plurality of stages; and a display panel displaying an image using the gate1 signal, the new gate1 signal, the odd gate2 signal, the even gate2 signal and the emission signal, wherein each of the plurality of stages includes: a gate1 signal block; an odd gate2 signal block; an even gate2 signal block; first and second stage transistors; and an emission signal block generating the emission signal. Accordingly, since the new gate signal is generated by using the stage transistor, the luminance deviation between the odd and even pixel lines is minimized.

13 Claims, 10 Drawing Sheets

(52) U.S. Cl.
CPC ............... *G09G 2320/0209* (2013.01); *G09G 2320/0233* (2013.01)

(56) References Cited

U.S. PATENT DOCUMENTS

| | | | | |
|---|---|---|---|---|
| 11,676,528 | B2 | 6/2023 | Kim et al. | |
| 2013/0083885 | A1* | 4/2013 | Lee | G11C 19/28 377/69 |
| 2015/0154941 | A1* | 6/2015 | Kanda | G09G 5/18 345/76 |
| 2016/0071614 | A1* | 3/2016 | Lee | G09G 3/3677 377/67 |
| 2016/0182048 | A1* | 6/2016 | Shin | G09G 3/3648 327/333 |
| 2017/0263203 | A1* | 9/2017 | Zhao | G09G 3/3677 |
| 2018/0108300 | A1* | 4/2018 | Zhao | G11C 19/28 |
| 2018/0190230 | A1* | 7/2018 | Wang | G09G 3/3677 |
| 2019/0096306 | A1* | 3/2019 | Kong | G11C 19/28 |
| 2019/0130842 | A1* | 5/2019 | Jang | G09G 3/3266 |
| 2019/0362670 | A1* | 11/2019 | Liu | G09G 3/3233 |
| 2020/0388214 | A1* | 12/2020 | Yang | G09G 3/3266 |
| 2021/0193784 | A1* | 6/2021 | Hong | H01L 27/1225 |
| 2021/0201817 | A1* | 7/2021 | Kim | G09G 3/3266 |
| 2021/0202638 | A1* | 7/2021 | Park | H01L 27/156 |
| 2022/0208074 | A1 | 6/2022 | Kim et al. | |
| 2022/0208075 | A1 | 6/2022 | Kim et al. | |
| 2023/0267872 | A1 | 8/2023 | Kim et al. | |
| 2024/0194134 | A1* | 6/2024 | Wang | G09G 3/20 |
| 2024/0212597 | A1* | 6/2024 | Wang | G09G 3/3233 |

* cited by examiner

DISPLAY DEVICE INCLUDING STAGE TRANSISTOR

CROSS-REFERENCE TO RELATED APPLICATIONS

The present application claims the priority benefit of Korean Patent Application No. 10-2022-0182698, filed in Republic of Korea on Dec. 23, 2022, which is hereby incorporated by reference herein in its entirety into the present application.

BACKGROUND

Technical Field

The present disclosure relates to a display device, and more particularly, to an organic light emitting diode display device generating a new gate signal using a stage transistor.

Discussion of the Related Art

Recently, with the advent of an information-oriented society, the interest in information displays for processing and displaying a massive amount of information and the demand for portable information media have increased. As such, a display field has rapidly advanced. Thus, various light and thin flat panel display devices have been developed and highlighted.

Among the various flat panel display devices, an organic light emitting diode (OLED) display device is an emissive type device that does not include a backlight unit used in a non-emissive type device such as a liquid crystal display (LCD) device. As a result, the OLED display device has advantages in a viewing angle, a contrast ratio and a power consumption to be applied to various fields.

Since the OLED display device uses a plurality of gate signals, the OLED display device may include a complicated gate driving unit. When some of the plurality of gate signals may be supplied to different pixel lines, a time delay of the gate signal is generated to cause a luminance deviation between the pixel lines.

SUMMARY OF THE DISCLOSURE

Accordingly, the present disclosure is directed to a display device that substantially obviates one or more of the problems due to limitations and disadvantages of the related art.

An object of the present disclosure is to provide a display device where a luminance deviation between odd and even pixel lines is minimized by generating a new gate signal using a stage transistor and supplying the new gate signal to one of the odd and even pixel lines.

Another object of the present disclosure is to provide a display device where deterioration of display quality such as a vertical triangle crosstalk is minimized by generating a new gate signal using a stage transistor and supplying the new gate signal to one of odd and even pixel lines in a display panel having a link line in a display area.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a timing controlling unit generating an image data, a data control signal and a gate control signal; a data driving unit generating a data signal using the image data and the data control signal; a gate driving unit generating a gate1 signal, a new gate1 signal, an odd gate2 signal, an even gate2 signal and an emission signal using the gate control signal and including a plurality of stages; and a display panel displaying an image using the gate1 signal, the new gate1 signal, the odd gate2 signal, the even gate2 signal and the emission signal, wherein each of the plurality of stages includes: a gate1 signal block generating the gate1 signal; an odd gate2 signal block generating the odd gate2 signal; an even gate2 signal block generating the even gate2 signal; first and second stage transistors switched according to the odd gate2 signal to generate the new gate1 signal; and an emission signal block generating the emission signal.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE EMBODIMENTS

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure. Further, the present disclosure is only defined by scopes of claims.

Hereinafter, a display device including a stage transistor according to embodiments of the present disclosure will be described in detail with reference to the accompanying drawings.

Figure 1:
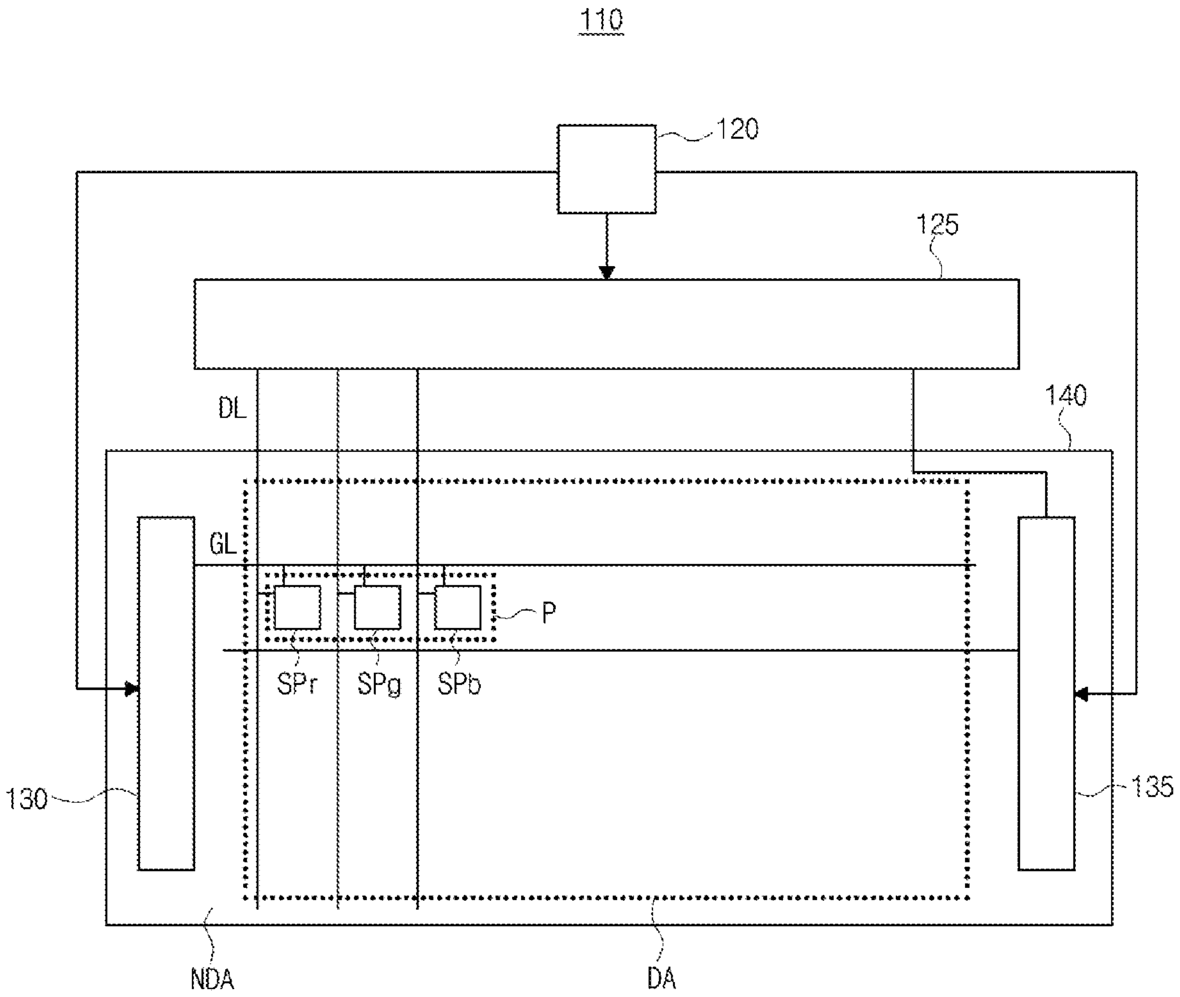
FIG. 1 is a view showing a display device according to an embodiment of the present disclosure.

FIG. 1 is a view showing a display device according to an embodiment of the present disclosure. The display device may be an organic light emitting diode (OLED) display device.

In FIG. 1, a display device 110 according to an embodiment of the present disclosure includes a timing controlling unit 120, a data driving unit 125, first and second gate driving units 130 and 135 and a display panel 140.

The timing controlling unit 120 generates an image data, a data control signal and a gate control signal using an image signal and a plurality of timing signals including a data enable signal, a horizontal synchronization signal, a vertical synchronization signal and a clock signal transmitted from an external system such as a graphic card or a television system. The image data and the data control signal are transmitted to the data driving unit 125, and the gate control signal is transmitted to the first and second gate driving units 130 and 135.

The data driving unit 125 generates a data signal (a data voltage) Vdata (of FIG. 3B) using the data control signal and the image data transmitted from the timing controlling unit 120 and transmits the data signal to a data line DL of the display panel 140.

The first and second gate driving units 130 and 135 generate a gate signal (a gate voltage) Sc1 and Sc2 (of FIG. 3B) and an emission signal (an emission voltage) Em (of FIG. 3B) using the gate control signal transmitted from the timing controlling unit 120 and applies the gate signal Sc1 and Sc2 and the emission signal Em to a gate line GL of the display panel 140.

The first and second gate driving units 130 and 135 may be a gate in panel (GIP) type formed in a non-display area NDA of a substrate of the display panel 140 having the gate line GL, the data line DL and a pixel P.

The display panel 140 includes a display area DA at a central portion thereof and a non-display area NDA surrounding the display area DA. The display panel 140 displays an image using the gate signal Sc1 and Sc2, the emission signal Em and the data signal Vdata. For displaying an image, the display panel 140 includes a plurality of pixels P, a plurality of gate lines GL and a plurality of data lines DL in the display area DA.

Each of the plurality of pixels P includes red, green and blue subpixels SPr, SPg and SPb, and the gate line GL and the data line DL cross each other to define the red, green and blue subpixels SPr, SPg and SPb. Each of the red, green and blue subpixels SPr, SPg and SPb is connected to the gate line GL and the data line DL.

When the display device 110 is an OLED display device, each of the red, green and blue subpixels SPr, SPg and SPb may include a plurality of transistors such as a switching transistor, a driving transistor and a sensing transistor, a storage capacitor and a light emitting diode.

The display device 110 where a link line may be disposed in the display area for reducing a bezel will be illustrated with reference to a drawing.

Figure 2:
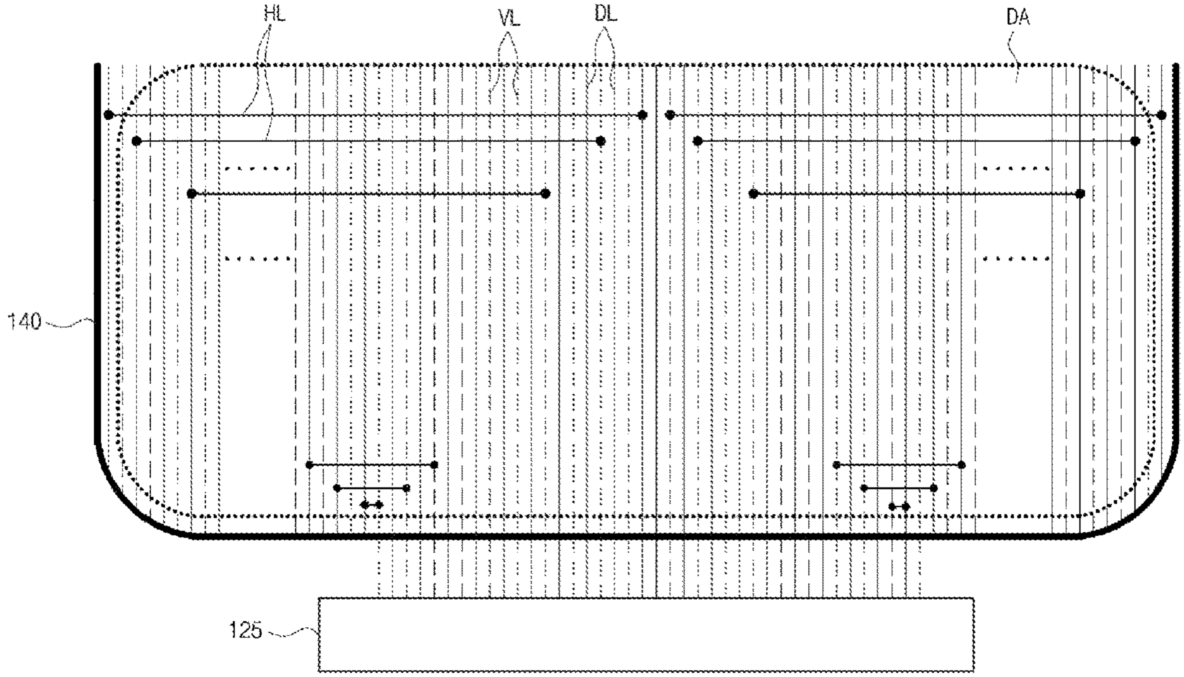
FIG. 2 is a plan view showing a display panel of a display device according to an embodiment of the present disclosure.

FIG. 2 is a plan view showing a display panel of a display device according to an embodiment of the present disclosure.

In FIG. 2, the display panel 140 of the display device 110 includes a plurality of vertical link lines VL and a plurality of horizontal link lines HL disposed in the display area DA adjacent to the data driving unit 125.

The plurality of vertical link lines VL are disposed to be parallel to the plurality of data lines DL and to be spaced apart from each other. The plurality of horizontal link lines HL are disposed to cross the plurality of data lines DL and to be spaced apart from each other.

Some of the plurality of data lines DL and some of the plurality of vertical link lines VL are connected to the data driving unit 125 to receive the data signal Vdata. The plurality of horizontal link lines HL connect the vertical link line VL connected to the data driving unit 125 and the data line DL not connected to the data driving unit 125 to supply the data signal.

A structure and an operation of the subpixel SP and the gate driving unit 130 and 135 of the display device 110 will be illustrated with reference to a drawing.

Figure 3A:
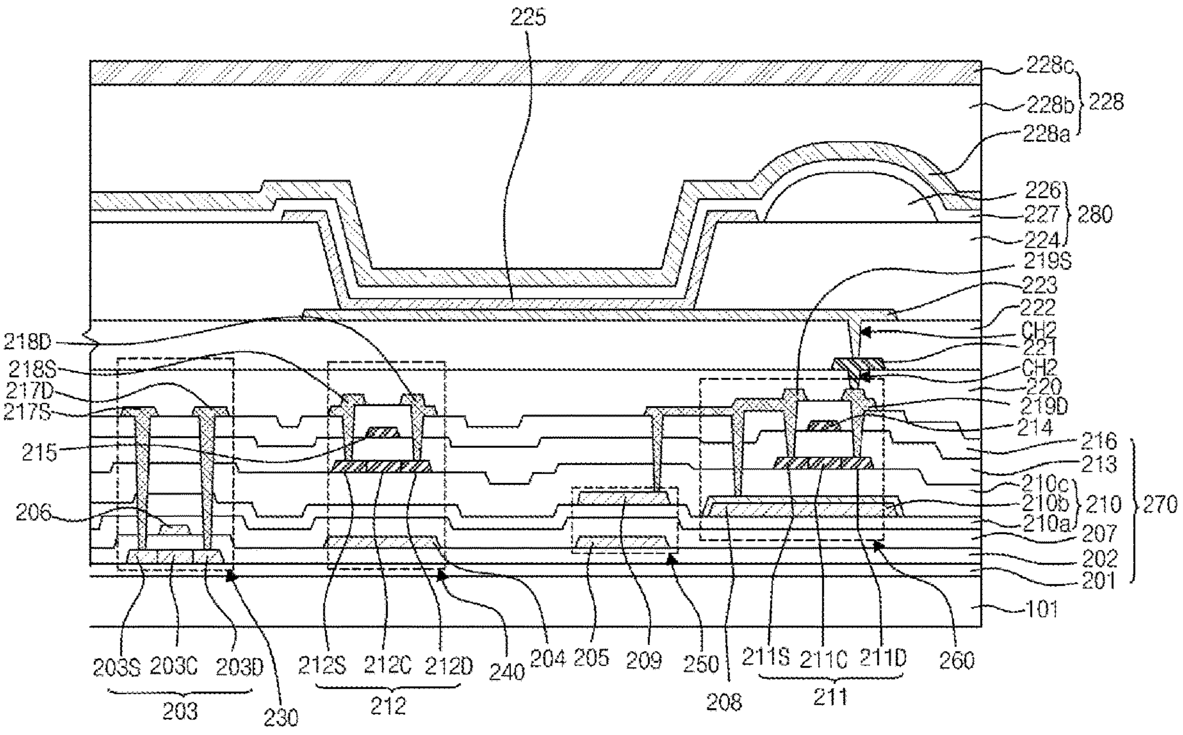
FIG. 3A is a cross-sectional view showing a display panel of a display device according to an embodiment of the present disclosure.
Figure 3B:
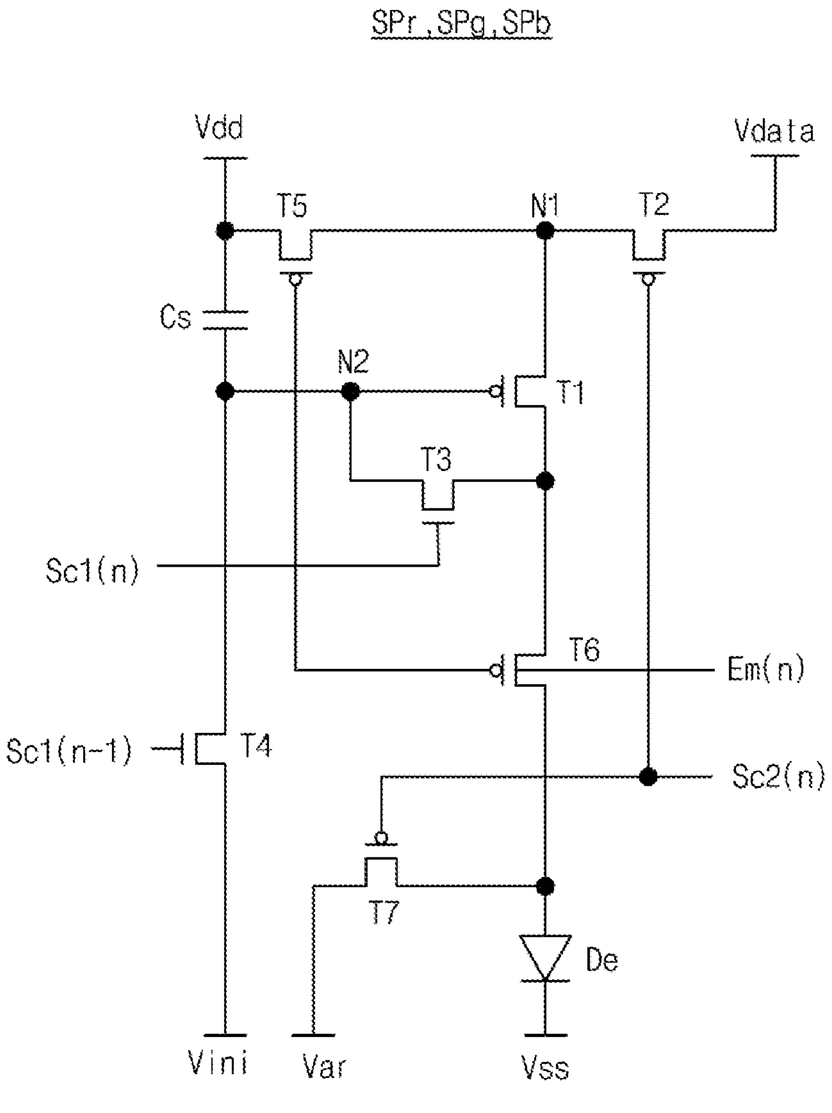
FIG. 3B is a circuit diagram showing a subpixel of a display device according to an embodiment of the present disclosure.
Figure 4:
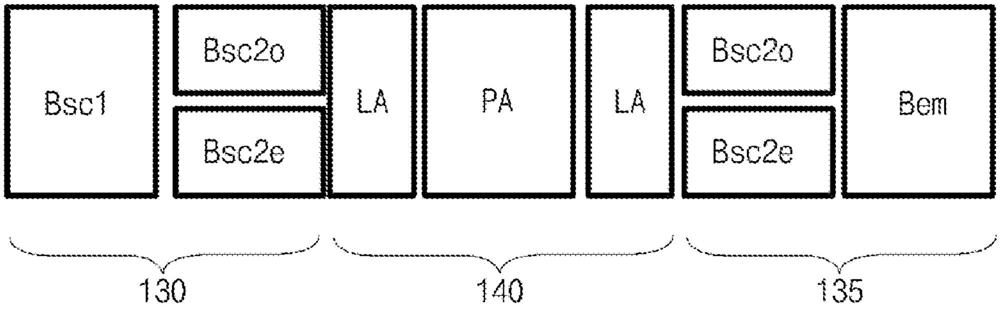
FIG. 4 is a block diagram showing first and second gate driving units and a display panel of a display device according to an embodiment of the present disclosure.
Figure 5:
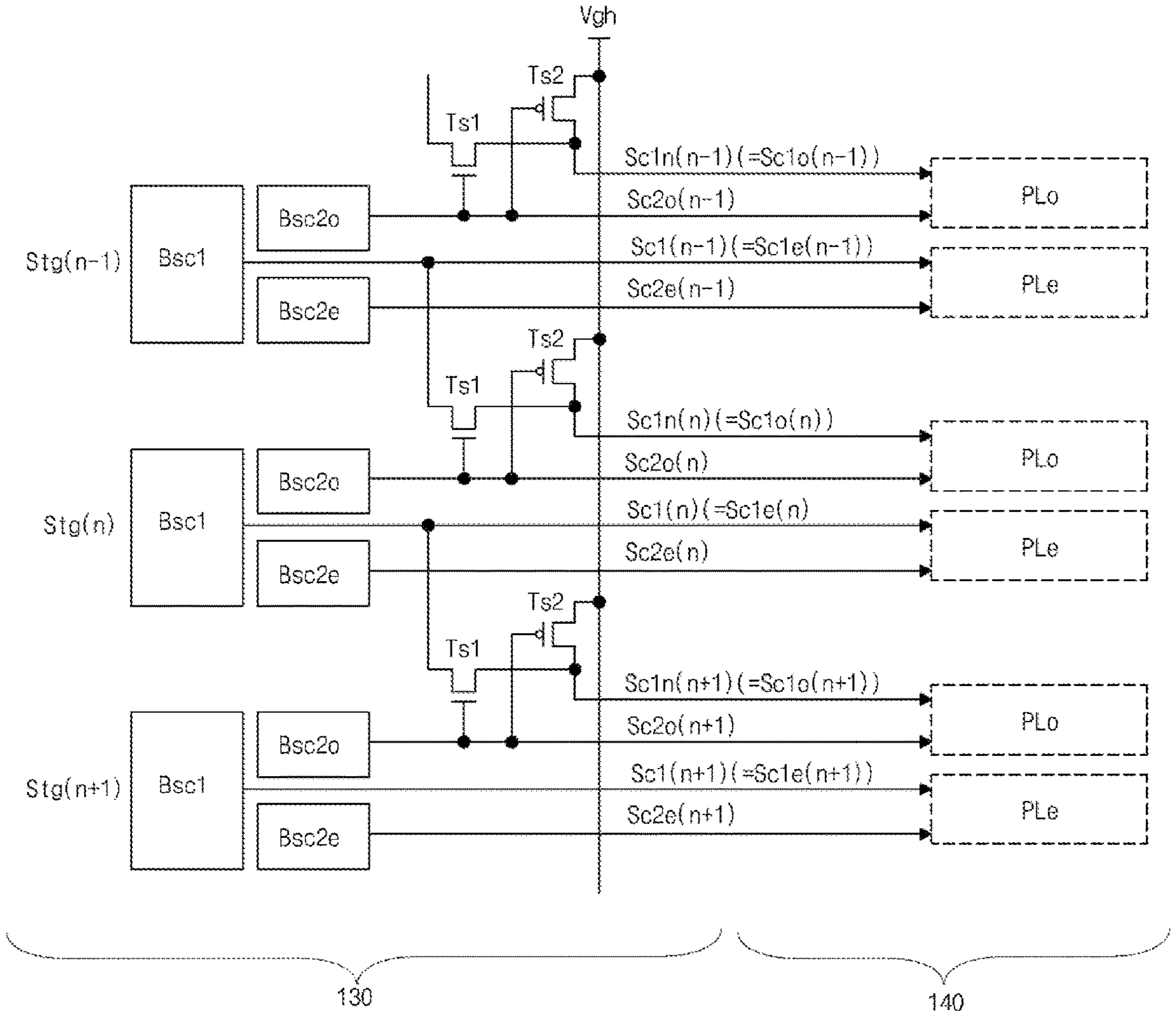
FIG. 5 is a view showing a first gate driving unit of a display device according to an embodiment of the present disclosure.
Figure 6:
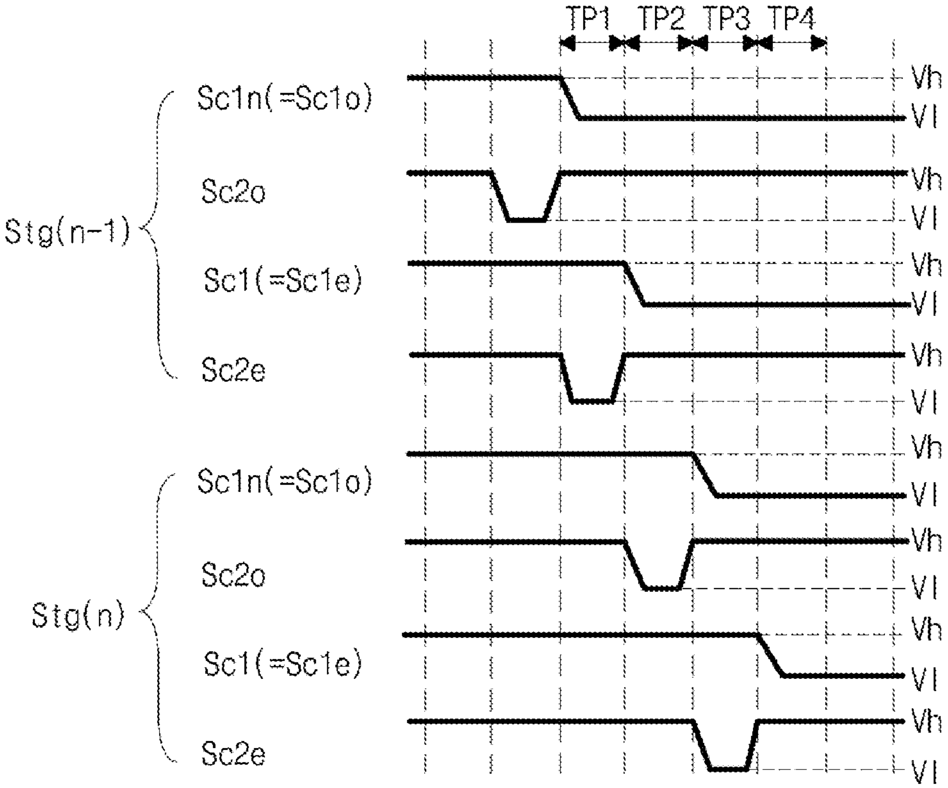
FIG. 6 is a view showing a plurality of signals outputted from a first gate driving unit of a display device according to an embodiment of the present disclosure.

FIG. 3A is a cross-sectional view showing a display panel of a display device according to an embodiment of the present disclosure, FIG. 3B is a circuit diagram showing a subpixel of a display device according to an embodiment of the present disclosure, FIG. 4 is a block diagram showing first and second gate driving units and a display panel of a display device according to an embodiment of the present disclosure, FIG. 5 is a view showing a first gate driving unit of a display device according to an embodiment of the present disclosure, and FIG. 6 is a view showing a plurality of signals outputted from a first gate driving unit of a display device according to an embodiment of the present disclosure.

In FIG. 3A, the display panel 140 of the display device 110 according to an embodiment of the present disclosure includes one driving transistor 260, two switching transistors 230 and 240 and one storage capacitor 250.

A driving element 270 and an emitting element electrically connected to the driving element 270 are disposed in one of the subpixels SPr, SPg and SPb on a substrate 101. The driving element 270 and the emitting element 280 are insulated from each other by planarizing layers 220 and 222.

The driving element 270 may be an array part including the driving transistor 260, the switching transistors 230 and 240 and the storage capacitor 250 and driving one of the subpixels SPr, SPg and SPb. The emitting element 280 may be an array part for emission including an anode 223, a cathode 227 and an emitting layer 225 between the anode 223 and the cathode 227. The driving element 270 may be a first array part, and the emitting element 280 may be a second array part. The embodiments of the present disclosure are not limited thereto.

Although one driving transistor 260, two switching transistors 230 and 240 and one storage capacitor 250 are shown in the embodiment of FIG. 3A, it is not limited thereto.

The driving transistor 260 and the at least one switching transistor use an oxide semiconductor layer as an active layer. The oxide semiconductor layer formed of an oxide semiconductor material has an excellent effect of blocking a leakage current and has a relatively low fabrication cost as compared with a polycrystalline silicon layer. For example, the oxide semiconductor layer may include indium gallium zinc oxide (IGZO), zinc oxide (ZnO), tin oxide ($SnO_2$), copper oxide ($Cu_2O$), nickel oxide (NiO), indium tin zinc oxide (ITZO) and/or indium aluminum zinc oxide (IAZO). The embodiments of the present disclosure are not limited thereto. In the embodiment of the present disclosure, to reduce a power consumption and a fabrication cost, the driving transistor 260 and the at least one switching transistor may be fabricated using an oxide semiconductor layer.

A transistor using a polycrystalline semiconductor layer including a polycrystalline semiconductor material, for example, polycrystalline silicon (poly-Si) has a relatively high operation speed and a relatively excellent reliability. In the embodiment of FIG. 3A, one of the switching transistors may include a polycrystalline semiconductor layer and the others of the switching transistors may include an oxide semiconductor layer. The embodiments of the present disclosure are not limited thereto.

At least one of one driving transistor 260 and two switching transistors 230 and 240 is a positive (P) type transistor and the others of one driving transistor 260 and two switching transistors 230 and 240 are a negative (N) type transistor. For example, the driving transistor 260 may be a P type, and the transistor having an oxide semiconductor layer of two switching transistors 230 and 240 may be a N type. The embodiments of the present disclosure are not limited thereto.

The substrate 101 may have multiple layers where at least one organic layer and at least one inorganic layer are alternately laminated. For example, the substrate 101 may have an organic layer including an organic material such as polyimide and an inorganic layer including an inorganic material such as silicon oxide (SiOx) alternately laminated with each other. The embodiments of the present disclosure are not limited thereto.

A lower buffer layer 201 may be disposed on the substrate 101. The lower buffer layer 201 may block a permeable substance such as moisture. The lower buffer layer 201 may have multiple layers of silicon oxide (SiOx). A second buffer layer may be further disposed on the lower buffer layer 201 for protection from moisture.

A first switching transistor 230 (one of second to seventh transistors T2 to T7 (of FIG. 3B)) may be disposed on the lower buffer layer 201. The first switching transistor 230 may use a polycrystalline semiconductor layer as an active layer. The first switching transistor 230 may include a first active layer 203 having a channel where an electron or a hole moves, a first gate electrode 206, a first source electrode 217S and a first drain electrode 217D.

The first active layer 203 may include a polycrystalline semiconductor material. The first active layer 203 may include a first channel region 203C and a first source region 203S and a first drain region 203D at both sides of the first channel region 203C.

The first source region 203S and the first drain region 203D may include a region conductorized by doping an intrinsic polycrystalline semiconductor pattern with an impurity of a V group or a III group, for example, phosphorus (P) or boron (B). The first channel region 203C where the polycrystalline semiconductor material is kept as an intrinsic state may provide a moving path for an electron or a hole.

The first switching transistor 230 may include a first gate electrode 206 overlapping the first channel region 203C of the first active layer 203. A first gate insulating layer 202 may be disposed between the first gate electrode 206 and the first active layer 203.

The first switching transistor 230 may have a top gate type where the first gate electrode 206 is disposed over the first active layer 203. The embodiments of the present disclosure are not limited thereto. A first capacitor electrode 205 and a second light shielding layer 204 of the second switching transistor 240 may be formed of a material for the first gate electrode 206 through one mask process. As a result, a number of the mask processes may be reduced.

The first gate electrode 206 may include a metallic material. For example, the first gate electrode 206 may have a single layer or multiple layers of one of molybdenum (Mo), aluminum (Al), chromium (Cr), gold (Au), titanium (Ti), nickel (Ni), neodymium (Nd), copper (Cu) and an alloy thereof. It is not limited thereto.

A first interlayer insulating layer 207 may be disposed on the first gate electrode 206. The first interlayer insulating layer 207 may include silicon nitride (SiNx). The first interlayer insulating layer 207 of silicon nitride (SiNx) may have a hydrogen particle. When heat treatment process is performed after the first active layer 203 is formed and the first interlayer insulating layer 207 is formed on the first active layer 203, the hydrogen particles of the first interlayer insulating layer 207 penetrate into the first source region 203S and the first drain region 203D to improve and stabilize a conductivity of the polycrystalline semiconductor material. The above process may be referred to as a hydrogenation process.

The first switching transistor 230 may further include an upper buffer layer 210, a second gate insulating layer 213 and a second interlayer insulating layer 216 sequentially on the first interlayer insulating layer 207. The first switching transistor 230 may include a first source electrode 217S and a first drain electrode 217D disposed on the second interlayer insulating layer 216 and connected to the first source region 203S and the first drain region 203D, respectively.

The upper buffer layer 210 may separate the first active layer 203 including a polycrystalline semiconductor material from the second active layer 212 of the second switching transistor 240 including an oxide semiconductor material and the third active layer 211 of the driving transistor 260 including an oxide semiconductor material. The upper buffer layer 210 may provide a base for the second active layer 212 and the third active layer 211.

A second interlayer insulating layer 216 may be disposed on the second gate electrode 215 of the second switching transistor 240 and the third gate electrode 214 of the driving transistor 260. Since the second interlayer insulating layer 216 is disposed on the second active layer 212 and the third active layer 211 including an oxide semiconductor material, the second interlayer insulating layer 216 may include an inorganic material without a hydrogen particle.

The first source electrode 217S and the first drain electrode 217D may have a single layer or multiple layers of one of molybdenum (Mo), aluminum (Al), chromium (Cr), gold (Au), titanium (Ti), nickel (Ni), neodymium (Nd), copper (Cu) and an alloy thereof. It is not limited thereto.

The second switching transistor 240 (another of second to seventh transistors T2 to T7) may be disposed on the upper buffer layer 210 and may include the second active layer 212 including an oxide semiconductor material, the second gate insulating layer 213 covering the second active layer 212, the second gate electrode 215 on the second gate insulating layer 213, the second interlayer insulating layer 216 covering the second gate electrode 215, and the second source electrode 218S and the second drain electrode 218D on the second interlayer insulating layer 216.

The second switching transistor 240 may further include a second light shielding layer 204 disposed under the upper buffer layer 210 and overlapping the second active layer 212. The second light shielding layer 204 may include the same material as the first gate electrode 206 and may be disposed on the first gate insulating layer 202.

The second light shielding layer 204 may be electrically connected to the second gate electrode 215 to constitute a dual gate. When the second switching transistor 240 has a dual gate structure, a current flow through a second channel region 212C may be more accurately controlled. Further, since a display device is formed to have a smaller size, a display device of a relatively high resolution may be obtained.

The second active layer 212 may include an oxide semiconductor material and may have a second channel region 212C, a second source region 212S and a second drain region 212D. The second channel region may have an intrinsic state not doped with an impurity, and the second source region 212S and the second drain region 212D may have a conductorization state doped with an impurity.

The second source electrode 218S and the second drain electrode 218D may have a single layer or multiple layers of one of molybdenum (Mo), aluminum (Al), chromium (Cr), gold (Au), titanium (Ti), nickel (Ni), neodymium (Nd), copper (Cu) and an alloy thereof. It is not limited thereto.

The second source electrode 218S, the second drain electrode 218D, the first source electrode 217S and the first drain electrode 217D may be simultaneously formed on the second interlayer insulating layer 216 with the same material. As a result, a number of the mask processes may be reduced.

The driving transistor 260 (a first transistor T1 (of FIG. 3B)) may be disposed on the upper buffer layer 210.

The driving transistor 260 may include a third active layer 211 including an oxide semiconductor material, a second gate insulating layer 213 covering the third active layer 211, a third gate electrode 214 disposed on the second gate insulating layer 213 and overlapping the third active layer 211, and a third source electrode 219S and a third drain electrode 219D on the second interlayer insulating layer 216.

The driving transistor 260 may further include a first light shielding layer 208 disposed in the upper buffer layer 210 and overlapping the third active layer 211. The first light shielding layer 208 may be formed to be inserted (or accommodated) into the upper buffer layer 210.

For a structure where the first light shielding layer 208 is disposed in the upper buffer layer 210, the first light shielding layer 208 may be disposed on a first upper sub-buffer layer 210*a* over the first interlayer insulating layer 207. A second upper sub-buffer layer 210*b* may be disposed on the first light shielding layer 208 to cover the first light shielding layer 208 completely, and a third upper sub-buffer layer 210*c* may be disposed on the second upper sub-buffer layer 210*b*. For example, the upper buffer layer 210 may have a structure where the first upper sub-buffer layer 210*a*, the second upper sub-buffer layer 210*b* and the third upper sub-buffer layer 210*c* are sequentially laminated.

The first upper sub-buffer layer 210*a* and the third upper sub-buffer layer 210*c* may include silicon oxide (SiOx). When the first upper sub-buffer layer 210*a* and the third upper sub-buffer layer 210*c* include silicon oxide (SiOx) without a hydrogen particle, the first upper sub-buffer layer 210*a* and the third upper sub-buffer layer 210*c* may be provided as a base for the second switching transistor 240 and the driving transistor 260 using an oxide semiconductor material susceptible to a hydrogen particle as an active layer.

The second upper sub-buffer layer 210*b* may include silicon nitride (SiNx) having an excellent capturing ability for a hydrogen particle. The second upper sub-buffer layer 210*b* may surround a top surface and a side surface of the first light shielding layer 208 to seal the first light shielding layer 208 completely.

A hydrogen particle generated in a hydrogenation process of the first switching transistor 230 using a polycrystalline semiconductor material as an active layer may pass through the upper buffer layer 210 to deteriorate a reliability of an oxide semiconductor material on the upper buffer layer 210. For example, when a hydrogen particle penetrates into an oxide semiconductor material, a transistor including an oxide semiconductor material may have different threshold voltages or may have different conductivities of a channel according to a position where the oxide semiconductor material is disposed.

Since silicon nitride (SiNx) has excellent capturing ability for a hydrogen particle, deterioration of a reliability of the driving transistor 260 due to a hydrogen particle penetrating into an oxide semiconductor material may be prevented.

The first light shielding layer 208 may include a metallic material such as titanium (Ti) having an excellent capturing ability for a hydrogen particle. For example, the first light shielding layer 208 may have a single layer of titanium (Ti), multiple layers of molybdenum (Mo) and titanium (Ti) or a single layer of an alloy of molybdenum (Mo) and titanium (Ti). In another embodiment, the first light shielding layer 208 may include another metallic material including titanium (Ti).

Titanium (Ti) may capture a hydrogen particle diffused in the upper buffer layer 210 to prevent a hydrogen particle from reaching the third active layer 211. When the first light shielding layer 208 of the driving transistor 260 is formed of a metallic material such as titanium (Ti) having a capturing ability for a hydrogen particle and is surrounded by silicon nitride (SiNx) having a capturing ability for a hydrogen particle, a reliability of a pattern of an oxide semiconductor material against a hydrogen particle is obtained.

Differently from the first upper sub-buffer layer 210*a*, the second upper sub-buffer layer 210*b* including silicon nitride (SiNx) is not disposed in the entire display area. Instead, the second upper sub-buffer layer 210*b* may be disposed on a portion of the first upper sub-buffer layer 210*a* to selectively cover the first light shielding layer 208. The second upper sub-buffer layer 210*b* may include a material such as silicon nitride (SiNx) different from a material of the first upper sub-buffer layer 210*a*. As a result, when the second upper sub-buffer layer 210*b* is disposed in the entire display area, the second upper sub-buffer layer 210*b* may be peeled off. To prevent the peeling, the second upper sub-buffer layer 210*b* may be selectively disposed on a portion where the first light shielding layer 208 is disposed.

The first light shielding layer 208 and the second upper sub-buffer layer 210*b* may be disposed directly under the third active layer 211 to overlap the third active layer 211. The first light shielding layer 208 and the second upper sub-buffer layer 210*b* may have a size greater than a size of the third active layer 211 to completely overlap the third active layer 211.

The third source electrode 219S of the driving transistor 260 may be electrically connected to the first light shielding layer 208.

The storage capacitor 250 (Cs (of FIG. 3B)) may store the data signal applied through the data line and may provide the data signal to the emitting element. The storage capacitor 250 may include two corresponding electrodes and a dielectric layer between the two electrodes. For example, the storage capacitor 250 may include a first capacitor electrode 205 having the same material and the same layer as the first gate electrode 206 and a second capacitor electrode 209 having the same material and the same layer as the first light shielding layer 208. The first interlayer insulating layer 207 and the first upper sub-buffer layer 210*a* may be disposed between the first capacitor electrode 205 and the second capacitor electrode 209. The second capacitor electrode 209 of the storage capacitor 250 may be electrically connected to the third source electrode 219S.

Although the storage capacitor 250 may be disposed at a side of the driving transistor 260, it is not limited thereto. In another embodiment, the storage capacitor 250 may be disposed to be laminated with the driving transistor 260. When the storage capacitor 250 is laminated with the driving transistor 260, at least portion of the third source electrode 219S connected to the second capacitor electrode 209 may be omitted. For example, a fourth gate electrode may be further disposed on the third gate electrode 214 of the driving transistor 260. The third gate electrode 214 and the fourth gate electrode may be spaced apart from each other to constitute the storage capacitor 250.

A first planarizing layer 220 and a second planarizing layer 222 may be disposed on the driving element 270 to planarize the driving element 270. The first planarizing layer 220 and the second planarizing layer 222 may include an organic material such as polyimide and acrylic resin. However, it is not limited thereto.

The emitting element 280 is disposed on the second planarizing layer 222. The emitting element 280 includes a first electrode 223 as an anode, a second electrode 227 as a cathode corresponding to the first electrode 223 and an emitting layer between the first electrode 223 and the second electrode 227. The first electrode 223 may be disposed in each subpixel.

The emitting element 280 may be connected to the driving element 270 through a connecting electrode 221 on the first planarizing layer 220. For example, the first electrode 223 of the emitting element 280 and the third drain electrode 219D of the driving transistor 260 of the driving element 270 may be connected to each other through the connecting electrode 221.

The first electrode 223 may contact the connecting electrode 221 exposed through a contact hole CH1 in the second planarizing layer 222. The connecting electrode 221 may contact the third drain electrode 219D exposed through a second contact hole CH2 in the first planarizing layer 220.

The first electrode 223 may have multiple layers including a transparent conductive material and an opaque conductive material having a relatively high reflectance. For example, the first electrode 223 may have a single layer or multiple layers including a transparent conductive material having a relatively high work function such as indium tin oxide (ITO) or indium zinc oxide (IZO) and an opaque conductive material such as aluminum (Al), silver (Ag), copper (Cu), lead (Pb), molybdenum (Mo), titanium (Ti) and an alloy thereof. The embodiments of the present disclosure are not limited thereto. For example, the first electrode 223 may have a structure where a transparent conductive layer, an opaque conductive layer and a transparent conductive layer are sequentially laminated or a structure where a transparent conductive layer and an opaque conductive layer are sequentially laminated. The embodiments of the present disclosure are not limited thereto.

The emitting layer 225 may include a hole assisting layer, an emitting material layer and an electron assisting layer sequentially on the first electrode 223 or an electron assisting layer, an emitting material layer and a hole assisting layer sequentially on the first electrode 223. A bank layer 224 may expose the first electrode 223 of the subpixel and may be referred to as a pixel defining layer. The bank layer 224 may include an opaque material, for example, a black colored material to prevent an optical interference between the adjacent subpixels. For example, the bank layer 224 may include a light shielding material of at least one of a color pigment, an organic black and a carbon. The embodiments of the present disclosure are not limited thereto. A spacer 226 may be disposed on the bank layer 224.

The second electrode 227 of a cathode is disposed on a top surface and a side surface of the emitting layer 225 to face the first electrode 223 with the emitting layer 225 interposed therebetween. The second electrode 227 may be disposed in the entire display area as one body. When the organic light emitting diode display device has a top emission type, the second electrode 227 may include a transparent conductive material such as indium tin oxide (ITO) or indium zinc oxide (IZO). The embodiments of the present disclosure are not limited thereto.

An encapsulating element 228 for preventing penetration of moisture may be further disposed on the second electrode 227. The encapsulating element 228 may include a first inorganic encapsulating layer 228*a*, a second organic encapsulating layer 228*b* and a third inorganic encapsulating layer 228*c* sequentially laminated.

The first inorganic encapsulating layer 228*a* and the third inorganic encapsulating layer 228*c* of the encapsulating element 228 may include an inorganic material such as silicon oxide (SiOx). The second organic encapsulating layer 228*b* of the encapsulating element 228 may include an organic material such as acrylic resin, epoxy resin, phenolic resin, polyamide resin and polyimide resin. The embodiments of the present disclosure are not limited thereto.

In FIG. 3B, each of red, green and blue subpixels SPr, SPg and SPb (SP) of the display panel 140 of the display device 110 according to an embodiment of the present disclosure includes first to seventh transistors T1 to T7, a storage capacitor Cs and a light emitting diode De. At least one of the first to seventh transistors T1 to T7 may be an oxide semiconductor thin film transistor, and the others of the first to seventh transistors T1 to T7 may be low temperature polycrystalline silicon thin film transistor.

For example, the first, second, fifth, sixth and seventh transistors T1, T2, T5, T6 and T7 may be a positive (P) type low temperature polycrystalline silicon thin film transistor, and the third and fourth transistors T3 and T4 may be a negative (N) type oxide semiconductor thin film transistor.

Alternatively, the second, fifth, sixth and seventh transistors T2, T5, T6 and T7 may be a low temperature polycrystalline silicon thin film transistor, and the first, third and fourth transistors T1, T3 and T4 may be an oxide semiconductor thin film transistor.

The first transistor T1 of a driving transistor is switched according to a voltage of the first capacitor electrode 205 of the storage capacitor Cs. A gate electrode of the first transistor T1 is connected to the first capacitor electrode 205 of the storage capacitor Cs, a drain electrode of the third transistor T3 and a drain electrode of the fourth transistor T4, a source electrode of the first transistor T1 is connected to a source electrode of the second transistor T2 and a drain electrode of the fifth transistor T5, and a drain electrode of the first transistor T1 is connected to a source electrode of the third transistor T3 and a source electrode of the sixth transistor T6.

The second transistor T2 of a switching transistor is switched according to an nth gate2 signal Sc2(*n*). A gate electrode of the second transistor T2 is connected to the nth gate2 signal Sc2(*n*), a source electrode of the second transistor T2 is connected to a source electrode of the first transistor T1 and a drain electrode of the fifth transistor T5, and a drain electrode of the second transistor T2 is connected to the data signal Vdata.

The third transistor T3 of a sensing transistor is switched according to an nth gate1 signal Sc1(*n*). A gate electrode of the third transistor T3 is connected to the nth gate1 signal Sc1(*n*), a source electrode of the third transistor T3 is connected to a drain electrode of the first transistor T1 and a source electrode of the sixth transistor T6, and a drain electrode of the third transistor T3 is connected to a gate electrode of the first transistor T1, a first capacitor electrode 205 of the storage capacitor Cs and a drain electrode of the fourth transistor T4.

The fourth transistor T4 is switched according to an (n−1)th gate1 signal Sc1(*n*−1). A gate electrode of the fourth transistor T4 is connected to the (n−1)th gate1 signal Sc1 (*n*−1), a source electrode of the fourth transistor T4 is connected to an initial voltage Vini, and a drain electrode of the fourth transistor T4 is connected to a gate electrode of the first transistor T1, a first capacitor electrode 205 of the storage capacitor Cs and a drain electrode of the third transistor T3.

The fifth transistor T5 is switched according to an nth emission signal Em(n). A gate electrode of the fifth transistor T5 is connected to the nth emission signal Em(n), a source electrode of the fifth transistor T5 is connected to a high level voltage Vdd and the second capacitor electrode 209 of the storage capacitor Cs, and a drain electrode of the fifth transistor T5 is connected to a source electrode of the first transistor T1 and a source electrode of the second transistor T2.

The sixth transistor T6 of an emission transistor is switched according to an nth emission signal Em(n). A gate electrode of the sixth transistor T6 is connected to the nth emission signal Em(n), a source electrode of the sixth transistor T6 is connected to a drain electrode of the first transistor T1 and a source electrode of the third transistor T3, and a drain electrode of the sixth transistor T6 is connected to an anode of the light emitting diode De and a source electrode of the seventh T7.

The seventh transistor T7 is switched according to an nth gate2 signal Sc2(*n*). A gate electrode of the seventh transistor T7 is connected to the nth gate2 signal Sc2(*n*), a source electrode of the seventh transistor T7 is connected to a drain electrode of the sixth transistor T6 and an anode of the light emitting diode De, and a drain electrode of the seventh transistor T7 is connected to an anode reset voltage Var.

The storage capacitor Cs stores the data signal Vdata and the threshold voltage Vth. A first capacitor electrode of the storage capacitor Cs is connected to the gate electrode of the first transistor T1 and the drain electrode of the fourth transistor T4, and a second capacitor electrode of the storage capacitor Cs is connected to the source electrode of the fifth transistor T5.

The light emitting diode De is connected between the sixth and seventh transistors T6 and T7 and the low level voltage Vss to emit light of a luminance proportional to a current of the first transistor T1. An anode of the light emitting diode De is connected to the drain electrode of the sixth transistor T6 and the source electrode of the seventh transistor T7, and a cathode of the light emitting diode De is connected to the low level voltage Vss.

The source electrode of the first transistor T1, the source electrode of the second transistor T2 and the drain electrode of the fifth transistor T5 constitute a first node N1, and the gate electrode of the first transistor T1, the drain electrode of the third transistor T3, the first capacitor electrode of the storage capacitor Cs and the drain electrode of the fourth transistor T4 constitute a second node N2.

In FIG. 4, the first gate driving unit 130 of the display device 110 according to an embodiment of the present disclosure includes a gate1 signal block Bsc1, an odd gate2 signal block Bsc2*o* and an even gate2 signal block Bsc2*e*, and the second gate driving unit 135 of the display device 110 according to an embodiment of the present disclosure includes an emission signal block Bem, an odd gate2 signal block Bsc2*o* and an even gate2 signal block Bsc2*e*. The display panel 140 includes a pixel area PA and a link area LA.

The gate1 signal block Bsc1, the odd gate2 signal block Bsc2*o* and the even gate2 signal block Bsc2*e* at one side of the pixel area PA may be one stage of a shift register, and the emission signal block Bem, the odd gate2 signal block Bsc2*o* and the even gate2 signal block Bsc2*e* at an opposite side of the pixel area PA may be one stage of a shift register. The shift register may include a plurality of stages connected to each other by a cascade type.

In the first gate driving unit 130, the gate1 signal block Bsc1 generates a gate1 signal Sc1, the odd gate2 signal block Bsc2*o* generates a gate2 signal Sc2, and the even gate2 signal block Bsc2*e* generates the gate2 signal Sc2.

The gate1 signal Sc1 of the gate1 signal block Bsc1 is supplied to an even pixel line PLe (of FIG. 5) of the pixel area PA through the link area LA. The gate2 signal Sc2 of the odd gate2 signal block Bsc2*o* is supplied to an odd pixel line PLo (of FIG. 5) through the link area LA, and the gate2 signal Sc2 of the even gate2 signal block Bsc2*e* is supplied to the even pixel line PLe of the pixel area PA through the link line LA.

The even pixel line PLe may be a row of pixels arranged in even order from a top portion of the display panel 140, and the odd pixel line PLo may be a row of pixels arranged in odd order from the top portion of the display panel 140.

First and second stage transistors Ts1 and Ts2 (of FIG. 5) are disposed in the odd and even gate2 signal blocks Bsc2*o* and Bsc2*e* or the link area LA. The first and second stage transistors Ts1 and Ts2 generate a new gate1 signal Sc1*n* (of FIG. 5) using the odd gate2 signal Sc2*o*, the gate1 signal Sc1 of a previous stage and a gate high voltage Vgh (of FIG. 5), and the new gate1 signal Sc1*n* is supplied to the odd pixel line PLo of the pixel area PA through the link area LA.

In another embodiment, the first and second gate driving units 130 and 135 may be symmetrically constituted with respect to each other. For example, each of the first and second gate driving units 130 and 135 may include the gate1 signal block Bsc1, the odd gate2 signal block Bsc2*o*, the even gate2 signal block Bsc2*e* and the emission block Bem.

In FIG. 5, the gate1 signal block Bsc1 of an nth stage Stg(n) of the first gate driving unit 130 generates an nth gate1 signal Sc1(*n*) and supplies the nth gate1 signal Sc1(*n*) to the even pixel line PLe as an nth even gate1 signal Sc1*e*(*n*). The odd gate2 signal block Bsc2*o* of the nth stage Stg(n) of the first gate driving unit 130 generates an nth odd gate2 signal Sc2*o*(*n*) and supplies the nth odd gate2 signal Sc2*o*(*n*) to the odd pixel line PLo. The even gate2 signal block Bsc2*e* of the nth stage Stg(n) of the first gate driving unit 130 generates an nth even gate2 signal Sc2*e*(*n*) and supplies the nth even gate2 signal Sc2*e*(*n*) to the even pixel line PLe.

The first and second stage transistors Ts1 and Ts2 are disposed between an output terminal of the nth stage Stg(n) and the odd and even pixel lines PLo and PLe. The first and second stage transistors Ts1 and Ts2 of the nth stage Stg(n) generates an nth new gate1 signal Sc1*n*(*n*) using an (n−1)th gate1 signal Sc1(*n*−1) of an (n−1)th stage Stg(n−1) of a previous stage and the gate high voltage Vgh and supplies the nth new gate1 signal Sc1*n*(*n*) to the odd pixel line PLo as an nth odd gate1 signal Sc1*o*(*n*).

For example, the first stage transistor Ts1 may be a negative (N) type thin film transistor having a width of about 50 μm and a length of about 10 μm (W/L=50 μm/10 μm=5), and the second stage transistor Ts2 may be a positive (P) type thin film transistor having a width of about 10 μm and a length of about 10 μm (W/L=10 μm/10 μm=1).

The first stage transistor Ts1 is switched according to the nth odd gate2 signal Sc2*o*(*n*) to transmit the (n−1)th gate1 signal Sc1(*n*−1), and the second stage transistor Ts2 is switched according to the nth odd gate2 signal Sc2*o*(*n*) to transmit the gate high voltage Vgh.

A gate electrode of the first stage transistor Ts1 is connected to the nth odd gate2 signal Sc2*o*(*n*), a source electrode of the first stage transistor Ts1 is connected to the (n−1)th gate1 signal Sc1(*n*−1), and a drain electrode of the first stage transistor Ts1 is connected to the odd pixel line PLo.

A gate electrode of the second stage transistor Ts2 is connected to the nth odd gate2 signal Sc2*o*(*n*), a source electrode of the second stage transistor Ts2 is connected to the gate high voltage Vgh, and a drain electrode of the second stage transistor Ts2 is connected to the odd pixel line PLo.

Similarly, the gate1 signal block Bsc1 of an (n+1)th stage Stg(n+1) of the first gate driving unit 130 generates an (n+1)th gate1 signal Sc1(*n*+1) and supplies the (n+1)th gate1 signal Sc1(*n*+1) to the even pixel line PLe as an (n+1)th even gate1 signal Sc1*e*(*n*+1). The odd gate2 signal block Bsc2*o* of the (n+1)th stage Stg(n+1) of the first gate driving unit 130 generates an (n+1)th odd gate2 signal Sc2*o*(*n*+1) and supplies the (n+1)th odd gate2 signal Sc2*o*(*n*+1) to the odd pixel line PLo. The even gate2 signal block Bsc2*e* of the (n+1)th stage Stg(n+1) of the first gate driving unit 130 generates an (n+1)th even gate2 signal Sc2*e*(*n*+1) and supplies the (n+1)th even gate2 signal Sc2*e*(*n*+1) to the even pixel line PLe.

The first and second stage transistors Ts1 and Ts2 of the (n+1)th stage Stg(n+1) generates an (n+1)th new gate1 signal Sc1*n*(*n*+1) using the nth gate1 signal Sc1(*n*) of an nth stage Stg(n) of a previous stage and the gate high voltage Vgh and supplies the (n+1)th new gate1 signal Sc1*n*(*n*+1) to the odd pixel line PLo as an (n+1)th odd gate1 signal Sc1*o*(*n*+1).

For example, the gate high voltage may be a logic high voltage Vh.

In another embodiment, the first and second stage transistors Ts1 and Ts2 may be disposed in the first gate driving unit 130 or in the link area LA of the display panel 140. However, it is not limited thereto.

In FIG. 6, the new gate1 signal Sc1*n* (i.e., the odd gate1 signal Sc1*o*) of the (n−1)th stage Stg(n−1) of the first gate driving unit 130 has a logic low voltage Vl during first, second, third and fourth periods TP1, TP2, TP3 and TP4, and the odd gate2 signal Sc2*o* of the (n−1)th stage Stg(n−1) of the first gate driving unit 130 has a logic high voltage Vh during the first, second, third and fourth periods TP1, TP2, TP3 and TP4. The gate1 signal Sc1 (i.e., the even gate1 signal Sc1*e*) of the (n−1)th stage Stg(n−1) of the first gate driving unit 130 has a logic high voltage Vh during the first period TP1 and has a logic low voltage Vl during the second, third and fourth periods TP2, TP3 and TP4. The even gate2 signal Sc2*e* of the (n−1)th stage Stg(n−1) of the first gate driving unit 130 has a logic low voltage Vl during the first period TP1 and has a logic high voltage Vh during the second, third and fourth periods TP2, TP3 and TP4.

The new gate1 signal Sc1*n* (i.e., the odd gate1 signal Sc1*o*) of the nth stage Stg(n) of the first gate driving unit 130 has a logic high voltage Vh during the first and second periods TP1 and TP2 and has a logic low voltage Vl during the third and fourth periods TP3 and TP4. The odd gate2 signal Sc2*o* of the nth stage Stg(n) of the first gate driving unit 130 has a logic high voltage Vh during the first, third and fourth periods TP1, TP3 and TP4 and has a logic high voltage Vh during the second period TP2. The gate1 signal Sc1 (i.e., the even gate1 signal Sc1*e*) of the nth stage Stg(n) of the first gate driving unit 130 has a logic high voltage Vh during the first, second and third periods TP1, TP2 and TP3 and has a logic low voltage Vl during the fourth period TP4. The even gate2 signal Sc2*e* of the nth stage Stg(n) of the first gate driving unit 130 has a logic high voltage Vh during the first, second and fourth periods TP1, TP2 and TP4 and has a logic low voltage Vl during the third period TP3.

During the first period TP1, in each of the odd and even pixel lines PLo and PLe, the second and seventh transistors T2 and T7 are turned off and the third and fourth transistors T3 and T4 are turned on. As a result, the initial voltage Vini is applied to the gate electrode and the drain electrode of the first transistor T1.

During the second period TP2, in the odd pixel line PLo, the fourth transistor T4 is turned off and the second, third and seventh transistors T2, T3 and T7 are turned on. As a result, the data signal Vdata is applied to the source electrode of the first transistor T1, and the threshold voltage Vth of the first transistor T1 is stored in the storage capacitor Cs (sampling). Further, the anode reset voltage Var is applied to the anode of the light emitting diode De. During the second period TP2, in the even pixel line PLe, the second and seventh transistors T2 and T7 are turned off and the third and fourth transistors T3 and T4 are turned on. As a result, voltages of the gate electrode and the drain electrode of the first transistor T1 are kept as the initial voltage Vini.

During the third period TP3, in the odd pixel line PLo, the second, third, fourth and seventh transistors T2, T3, T4 and T7 are turned off. As a result, voltages of the gate electrode, the source electrode and the drain electrode of the first transistor T1 are maintained. During the third period TP3, in the even pixel line PLe, the fourth transistor T4 is turned off and the second, third and seventh transistors T2, T3 and T7 are turned on. As a result, the data signal Vdata is applied to the source electrode of the first transistor T1, and the threshold voltage Vth of the first transistor T1 is stored in the storage capacitor Cs (sampling). Further, the anode reset voltage Var is applied to the anode of the light emitting diode De.

During the fourth period TP4, in each of the odd and even pixel lines PLo and PLe, the second, third, fourth and seventh transistors T2, T3, T4 and T7 are turned off. As a result, voltages of the gate electrode, the source electrode and the drain electrode of the first transistor T1 are maintained.

When the odd and even pixel lines PLo and PLe perform a sampling for the threshold voltage Vth of the first transistor T1 using one gate1 signal Sc1, a rising timing of the even gate2 signal Sc2e may coincide with a falling timing of the gate1 signal Sc1 and a time delay may not occur in the even pixel line PLe. However, a time delay between a rising timing of the odd gate2 signal Sc2o and a falling timing of the gate1 signal Sc1 may occur in the odd pixel line PLo. As a result, a coupling between a vertical link line VL where the data signal Vdata is applied and the first node N1 may occur for the delayed time, and a voltage of the second node N2 may increase. Accordingly, luminance deviation between the odd and even pixel lines PLo and PLe may occur, and deterioration of a display quality such as a vertical triangle crosstalk may occur.

However, in the display device 110 according to an embodiment of the present disclosure, the odd and even pixel lines PLo and PLe perform a sampling for the threshold voltage Vth of the first transistor T1 using the odd and even gate1 signals Sc1o and Sc1e, respectively. As a result, in the odd pixel line PLo, a rising timing of the odd gate2 signal Sc2o coincides with a falling timing of the odd gate1 signal Sc1o and a time delay does not occur. Further, in the even pixel line PLe, a rising timing of the even gate2 signal Sc2e coincides with a falling timing of the even gate1 signal Sc1e and a time delay does not occur.

Accordingly, a voltage rising of the second node N2 due to a coupling between the vertical link line VL where the data voltage Vdata is applied and the first node N1 is prevented, the luminance deviation between the odd and even pixel lines PLo and PLe is minimized, and deterioration of the display quality such as a vertical triangle crosstalk is prevented.

An operation of generating the new gate1 signal Sc1n due to the first and second stage transistors Ts1 and Ts2 may be illustrated with reference to drawings.

Figure 7A:
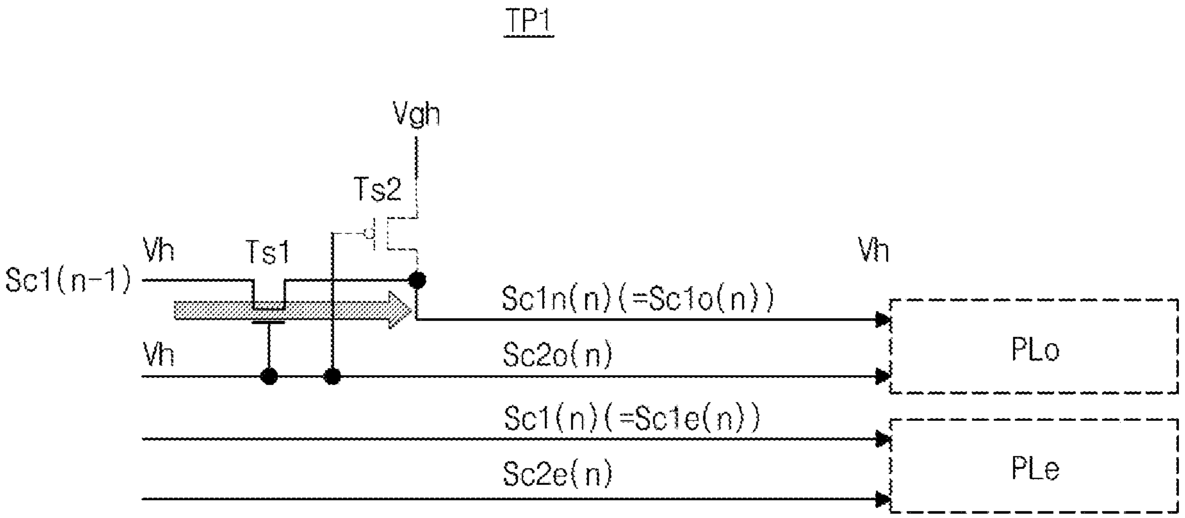
FIGS. 7A and 7B are views showing an operation state of first and second stage transistors of an nth stage and a state of a plurality of signals, respectively, during a first period of a display device according to an embodiment of the present disclosure.
Figure 7B:
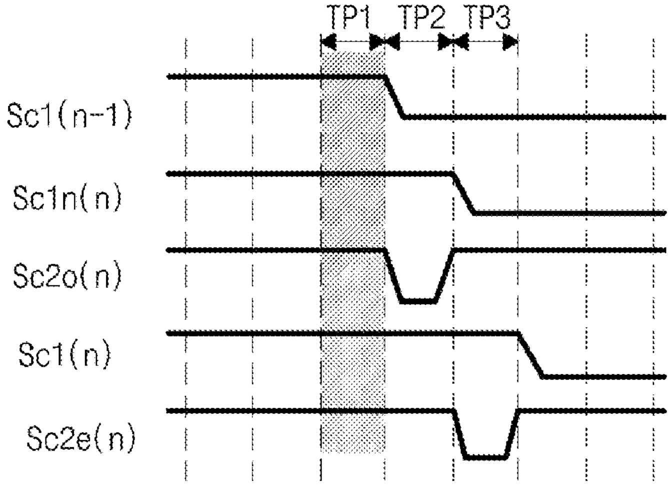
Figure 8A:
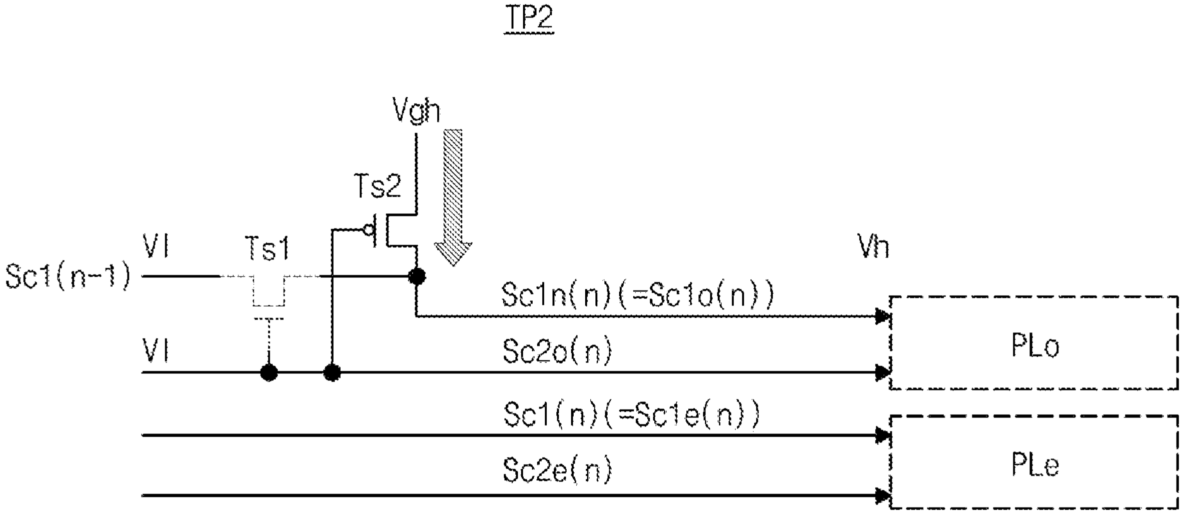
FIGS. 8A and 8B are views showing an operation state of first and second stage transistors of an nth stage and a state of a plurality of signals, respectively, during a second period of a display device according to an embodiment of the present disclosure.
Figure 8B:
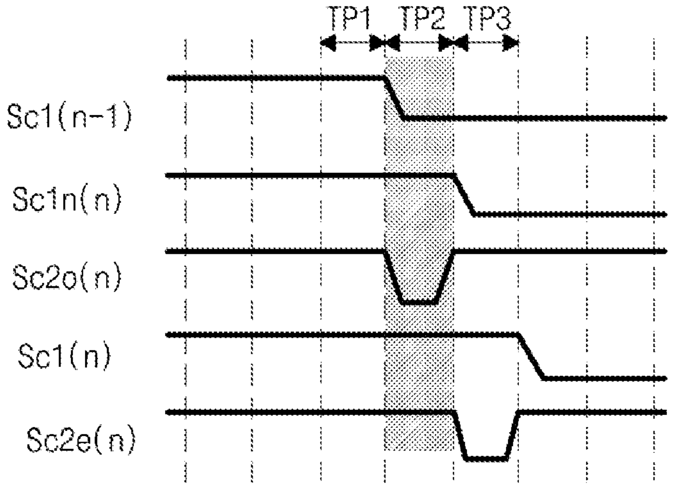
Figure 9A:
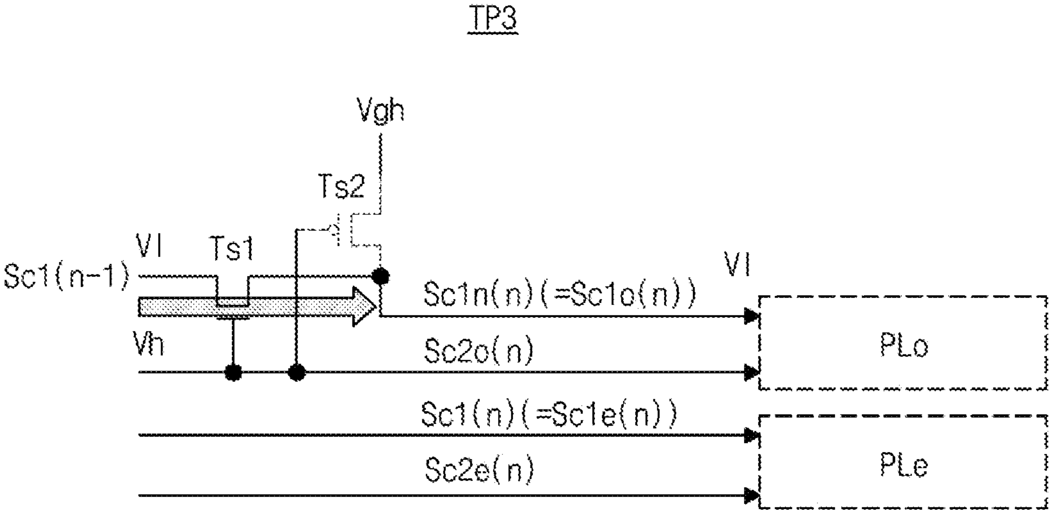
FIGS. 9A and 9B are views showing an operation state of first and second stage transistors of an nth stage and a state of a plurality of signals, respectively, during a third period of a display device according to an embodiment of the present disclosure.
Figure 9B:
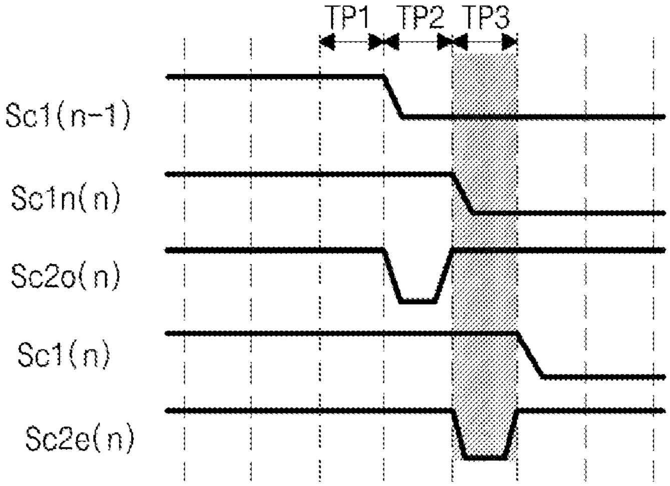

FIGS. 7A and 7B are views showing an operation state of first and second stage transistors of an nth stage and a state of a plurality of signals, respectively, during a first period of a display device according to an embodiment of the present disclosure, FIGS. 8A and 8B are views showing an operation state of first and second stage transistors of an nth stage and a state of a plurality of signals, respectively, during a second period of a display device according to an embodiment of the present disclosure, and FIGS. 9A and 9B are views showing an operation state of first and second stage transistors of an nth stage and a state of a plurality of signals, respectively, during a third period of a display device according to an embodiment of the present disclosure.

In FIGS. 7A and 7B, during the first period TP1, the (n−1)th gate1 signal Sc1(n−1), the nth odd gate2 signal Sc2o(n), the nth gate1 signal Sc1(n) and the nth even gate2 signal Sc2e(n) have a logic high voltage Vh.

As a result, in the nth stage Stg(n), the first stage transistor Ts1 is turned on and the second stage transistor Ts2 is turned off, and the nth new gate1 signal Sc1n(n) has a logic high voltage Vh due to the (n−1)th gate1 signal Sc1(n−1).

In FIGS. 8A and 8B, during the second period TP2, the (n−1)th gate1 signal Sc1(n−1) and the nth odd gate2 signal Sc2o(n) have a logic low voltage, and the nth gate1 signal Sc1(n) and the nth even gate2 signal Sc2e(n) have a logic high voltage Vh.

As a result, in the nth stage Stg(n), the first stage transistor Ts1 is turned off and the second stage transistor Ts2 is turned on, and the nth new gate1 signal Sc1n(n) has a logic high voltage Vh due to the gate high voltage Vgh.

In FIGS. 9A and 9B, during the third period TP3, the (n−1)th gate1 signal Sc1(n−1) and the nth even gate2 signal Sc2e(n) have a logic low voltage Vl, and the nth gate1 signal Sc1(n) and the nth odd gate2 signal Sc2o(n) have a logic high voltage Vh.

As a result, in the nth stage Stg(n), the first stage transistor Ts1 is turned on and the second stage transistor Ts2 is turned off, and the nth new gate1 signal Sc1n(n) has a logic low voltage Vl due to the (n−1)th gate1 signal Sc1(n−1).

The first and second stage transistors Ts1 and Ts2 of the nth stage Stg(n) are switched according to the nth odd gate2 signal Sc2o(n) to generate the nth new gate1 signal Sc1n(n) using the (n−1)th gate1 signal Sc1(n−1) of the (n−1)th stage Stg(n−1) as a previous stage or the gate high voltage Vgh and to supply the nth new gate1 signal Sc1n(n) to the odd pixel line PLo as the nth odd gate1 signal Sc1o(n).

In the display device 110 according to an embodiment of the present disclosure, the first and second stage transistors Ts1 and Ts2 are disposed between the output terminal of the first gate driving unit 130 and the odd and even pixel lines PLo and PLe, the first and second stage transistors Ts1 and Ts2 generates the new gate1 signal Sc1n using the gate1 signal Sc1 of the previous stage and the gate high voltage Vgh, and the new gate1 signal Sc1n is supplied to the odd pixel line PLo as the odd gate1 signal Sc1o.

Since the odd and even pixel lines PLo and PLe perform a sampling for the threshold voltage Vth of the first transistor T1 using the odd and even gate1 signals Sc1o and Sc1e, respectively, the rising timing of the gate2 signal Sc2 coincides with the falling timing of the gate1 signal Sc1 in the odd and even pixel lines PLo and PLe. As a result, the voltage rising of the second node N2 due to the coupling between the vertical link line VL where the data signal Vdata is applied and the first node N1 is prevented, the luminance deviation between the odd and even pixel lines PLo and PLe is minimized, and deterioration of the display quality such as a vertical triangle crosstalk is prevented.

Consequently, in the display device 110 according to an embodiment of the present disclosure, since the new gate signal generated by using the stage transistor is supplied to one of the odd and even pixel lines, the luminance deviation between the odd and even pixel lines is minimized.

Further, since the new gate signal is generated by using the stage transistor in the display panel where the link line is disposed in the display area and is supplied to one of the odd and even pixel lines, deterioration of the display quality such as a vertical triangle crosstalk is minimized.

It will be apparent to those skilled in the art that various modifications and variation can be made in the present disclosure without departing from the scope of the disclosure. Thus, it is intended that the present disclosure cover the modifications and variations of this disclosure provided they come within the scope of the appended claims.

What is claimed is:

1. A display device, comprising:

a timing controller configured to generate an image data, a data control signal and a gate control signal;

a data driver configured to generate a data signal using the image data and the data control signal;

a gate driver configured to generate an even gate1 signal, an odd gate1 signal, an odd gate2 signal, an even gate2 signal and an emission signal using the gate control signal and including a plurality of stages; and a display panel configured to generate an image using the even gate1 signal, the odd gate1 signal, the odd gate2 signal, the even gate2 signal and the emission signal, wherein each of the plurality of stages comprises:

a gate1 signal circuit configured to generate the even gate1 signal;

an odd gate2 signal circuit configured to generate the odd gate2 signal;

an even gate2 signal circuit configured to generate the even gate2 signal;

first and second stage transistors switched according to the odd gate2 signal to generate the odd gate1 signal; and an emission signal circuit configured to generate the emission signal, wherein the display panel includes an odd pixel line and an even pixel line, wherein the odd gate1 signal outputted from the first and second stage transistors and the odd gate2 signal outputted from the odd gate2 signal circuit are supplied to the odd pixel line of the display panel, and wherein the even gate1 signal outputted from the gate1 signal circuit and the even gate2 signal outputted from the even gate2 signal circuit are supplied to the even pixel line of the display panel.

2. The display device of claim 1, wherein the plurality of stages include an (n−1)th stage and an nth stage, wherein a gate electrode, a source electrode and a drain electrode of the first stage transistor of the nth stage are connected to the odd gate2 signal circuit of the nth stage, the gate1 signal circuit of the (n−1)th stage and the display panel, respectively, and wherein a gate electrode, a source electrode and a drain electrode of the second stage transistor of the nth stage are connected to the odd gate2 signal circuit of the nth stage, a first logic voltage and the display panel, respectively.

3. The display device of claim 2, wherein, in the (n−1)th stage, the odd gate1 signal has a second logic voltage lower than the first logic voltage during first, second, third and fourth periods, the odd gate2 signal has the first logic voltage during the first, second, third and fourth periods, the even gate1 signal has the first logic voltage during the first period and has the second logic voltage during the second, third and fourth periods, and the even gate2 signal has the second logic voltage during the first period and has the first logic voltage during the second, third and fourth periods, and wherein, in the nth stage, the odd gate1 signal has the first logic voltage during the first and second periods and has the second logic voltage during the third and fourth periods, the odd gate2 signal has the first logic voltage during the first, third and fourth periods and has the second logic voltage during the second period, the even gate1 signal has the first logic voltage during the first, second and third periods and has the second logic voltage during the fourth period, and the even gate2 signal has the first logic voltage during the first, second and fourth periods and has the second logic voltage during the third period.

4. The display device of claim 3, wherein, during the first period, the first stage transistor of the nth stage is turned on and the second stage transistor of the nth stage is turned off such that the even gate1 signal of the nth stage has the first logic voltage due to the even gate1 signal of the (n−1)th stage, wherein, during the second period, the first stage transistor of the nth stage is turned off and the second stage transistor of the nth stage is turned on such that the even gate1 signal of the nth stage has the first logic voltage due to the first logic voltage, and wherein, during the third period, the first stage transistor of the nth stage is turned on and the second stage transistor of the nth stage is turned off such that the odd gate1 signal of the nth stage has the second logic voltage due to the even gate1 signal of the (n−1)th stage.

5. The display device of claim 1, wherein the display panel has first and second sides opposite to each other, and the gate driver includes first and second gate drivers at the first and second sides, respectively, of the display panel, wherein the first gate driver includes the gate1 signal circuit, the odd gate2 signal circuit and the even gate2 signal circuit, and wherein the second gate driver includes the emission signal circuit, the odd gate2 signal circuit and the even gate2 signal circuit.

6. The display device of claim 1, wherein the display panel includes a display area at a central portion thereof and a non-display area surrounding the display area, wherein a plurality of pixels, a plurality of gate lines, a plurality of data lines, a plurality of vertical link lines and a plurality of horizontal link lines are disposed in the display area, and wherein some of the plurality of data lines and some of the plurality of vertical link lines are connected to the data driver, others of the plurality of data lines are not connected to the data driver, and the plurality of horizontal link lines connect the some of the plurality of vertical link lines connected to the data driver and the others of the plurality of data lines not connected to the data driver.

7. The display device of claim 1, wherein the display panel includes a plurality of subpixels, and wherein each of the plurality of subpixels comprises:

a storage capacitor connected to a first level voltage;

a first transistor switched according to a voltage of a first capacitor electrode of the storage capacitor;

a second transistor switched according to the gate2 signal and connected to the data signal and the first transistor;

a third transistor switched according to one of the even gate1 signal and the odd gate1 signal and connected to the storage capacitor and the first transistor;

a fourth transistor switched according to one of the even gate1 signal and the odd gate1 signal and connected to the storage capacitor and an initial voltage;

a fifth transistor switched according to the emission signal and connected to the first level voltage and the first transistor;

a sixth transistor switched according to the emission signal and connected to the first transistor;

a seventh transistor switched according to the gate2 signal and connected to an anode reset voltage; and a light emitting diode connected between the sixth transistor and a second level voltage lower than the first level voltage.

8. The display device of claim 7, wherein the plurality of subpixels are disposed in an odd pixel line and an even pixel line of the display panel, wherein the third and fourth transistors of the odd pixel line are switched according to the odd gate1 signal, and wherein the third and fourth transistors of the even pixel line are switched according to the even gate1 signal.

9. The display device of claim 7, wherein at least one of the first to seventh transistors is an oxide semiconductor thin film transistor.

10. The display device of claim 1, wherein the first and second stage transistors are disposed in one of the gate driver and the display panel.

11. The display device of claim 1, wherein in the even pixel line, a rising timing of the even gate2 signal coincides with a falling timing of the odd gate1 signal.

12. The display device of claim 8, wherein the odd and even pixel lines perform a sampling for a threshold voltage of the first transistor using the odd gate1 signal and the even gate1 signal, respectively.

13. The display device of claim 1, wherein the plurality of stages include a previous stage and a present stage, and wherein a gate electrode of the first stage transistor of the present stage is connected to an output terminal of the odd gate2 signal circuit of the present stage, a source electrode of the first stage transistor of the present stage is connected to an output terminal of the gate1 signal circuit of the previous stage, and a drain electrode of the first stage transistor of the present stage is connected to the odd pixel line of the display panel, respectively.

* * * * *